United States Patent

[11] 3,634,869

[72] Inventor Chia Ying Hsueh
42 Old Colony Drive, Westboro, Mass. 01581

[21] Appl. No. 102,389
[22] Filed Dec. 29, 1970
[45] Patented Jan. 11, 1972

[54] INTERPULSE TIME INTERVAL DETECTION CIRCUIT
6 Claims, 2 Drawing Figs.

[52] U.S. Cl. 307/234, 179/100.2 S, 307/233, 328/110, 328/111
[51] Int. Cl. H03k 5/18
[50] Field of Search 307/232, 233, 234; 328/111, 112, 109, 110, 119, 120; 179/100.2 S

[56] References Cited

UNITED STATES PATENTS

| | | | |
|---|---|---|---|
| 3,071,732 | 1/1963 | Martin et al. | 307/234 X |
| 3,196,358 | 7/1965 | Bagley | 328/110 X |
| 3,413,412 | 11/1968 | Townsend | 307/234 X |
| 3,473,130 | 10/1969 | Briggs | 328/109 |
| 3,555,434 | 1/1971 | Sheen | 307/234 X |

*Primary Examiner*—Donald D. Forrer
*Assistant Examiner*—R. C. Woodbridge
*Attorney*—H. Christoffersen

ABSTRACT: Circuit for producing an output signal when a group of serial input signals, which are separated by decreasing intervals of time, are separated by a given interval of time. The input signals set a flip-flop which is reset by the input pulses delayed by the given interval of time. A second flip-flop producing the output signal is set by the input signals if the first flip-flop is set and is reset if the first flip-flop is reset.

*INVENTOR*
*Chia Y. Hsueh*
*BY* H. Christoffersen
*ATTORNEY*

INTERPULSE TIME INTERVAL DETECTION CIRCUIT

BACKGROUND OF THE INVENTION

There are many applications in which it is desirable to have an indication that in a serial group of pulses, the interpulse time interval has a given value. In electromechanical storage devices used in connection with electronic computers, such as magnetic tape stations, magnetic drums, or magnetic discs, it is important to know when the recording medium is up to speed. Up-to-speed time is an important parameter of such devices. If the recording medium is not traveling at the proper velocity relative to the reading transducers, the frequency and amplitude response of the reading circuits become degraded and information is lost.

On tape stations, for example, blocks of information are recorded on the tape separated by interblock gaps. The gaps provide a position in which the tape can be stopped after reading the information in the preceding block. When the tape is accelerated from rest to read the next block of information, the tape must achieve its proper velocity within a given interval of time. Otherwise, the first several characters of the block of information to be read might be read incorrectly or not at all.

In magnetic disc and magnetic drum storage devices, the surface of the recording medium must reach a specified velocity before the transducers are positioned into close proximity to the surface for reading. The closeness of the transducers for proper reading is usually maintained by a cushion of air on which the transducers ride. The cushion of air is caused by the velocity of the surface. If the surface velocity is not sufficiently great to maintain the proper cushion of air, the transducers will strike against the surface, damaging the magnetic recording medium.

To test electromechanical devices such as described above, a standard recorded medium can be used. The characters on the medium are recorded on a master device, for instance, so that the physical distance between successive characters is carefully controlled. Reading the test medium on a device and measuring the time interval between characters will give a measurement of the recording medium surface velocity with respect to the reading transducers.

To test a device's up-to-speed time, the time interval between the command signal transmitted to start the device and an output signal from the device that the characters on the specially prepared medium are being read at given time intervals of time can be measured and compared to a value representing the desired interval. If the up-to-speed time interval is too long for proper operation, then it is an indication that repairs to the electromechanical device are probably necessary. Testing of this nature can be performed by electronic computers to which the devices may be connected.

The purpose of this invention is to provide an output signal when the time interval between adjacent signals of a group of serial signals separated by decreasing time intervals are separated by a given time interval.

BRIEF DESCRIPTION OF THE INVENTION

A circuit for providing an indicative output signal when two input signals are separated by a given interval of time has a first flip-flop which is set by the trailing edge of the input signals. A delay circuit resets the first flip-flop a given interval of time after the trailing edge of the input signal. A second flip-flop is connected to be set by an input signal if the first flip-flop is set and reset if the first flip-flop is reset. The indicative output signal is produced by the second flip-flop when set.

DETAILED DESCRIPTION OF THE INVENTION

Figure 1:
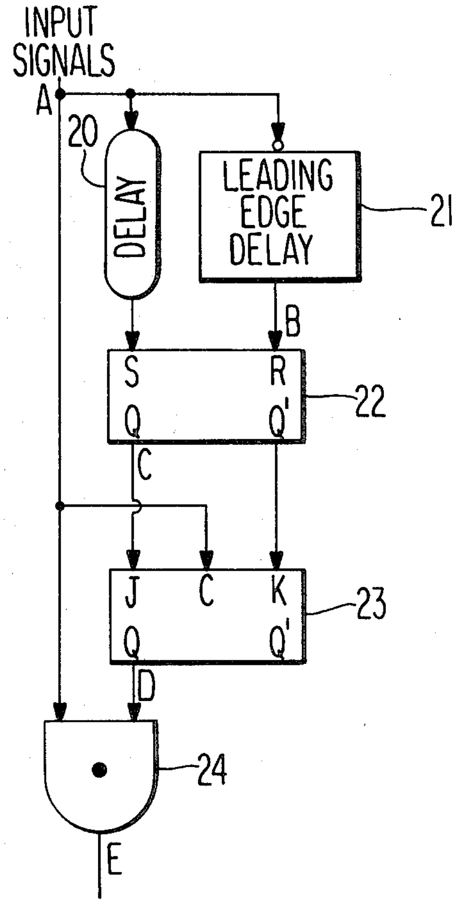
FIG. 1 is a schematic of a preferred embodiment of the invention.

The embodiment of the invention herein described is one that might be used in magnetic tape stations. This is for illustrative purposes only since the invention can be adapted to many different types of devices.

The invention is described using digital-type circuitry including coincidence gates, flip-flops, delay lines, and leading edge delay circuits. The digital signals used in the circuits have the values of 1 or 0, represented by two distinct voltage levels. The higher voltage level traditionally represents the signal value of 1 and the lower, the signal value of 0. A signal having the value of 1 is sometimes simply called a signal, and a signal having the value of 0 is often referred to as no signal.

A coincidence gate produces an output signal having the value of 1 only when all the input signals have the value of 1. If any input signal has the value of 0, the output signal of the coincidence gate is 0.

A flip-flop has two output signals which are complementary to one another. When one output signal has the value of 1, i.e., at the higher of two possible stable output voltages, the other output signal has a value of 0, i.e., at the lower of two possible stable output voltages. The output terminals are labeled, conventionally, Q and Q′. When the Q output signal is 1 (and the Q′ output signal is 0), the flip-flop is referred to as set; when the Q′ output signal is 1 (and the Q output signal is o), the flip-flop is referred to as reset.

The clocked J-K-type flip-flop changes state, i.e., from set to reset or vice versa, only in response to a clock pulse and the state is determined by the value of the signals at the J- and K-input terminals. If, at the time the clock pulse occurs, both the J- and K-input signals are 0, the state of the flip-flop remains unchanged. If the J-input signal is 1 and the K-input signal is 0, the flip-flop will assume the set state at the occurrence of the next clock pulse, regardless of its state prior to the clock pulse. Likewise, if the J-input signal is 0 and the K-input signal is 1, the flip-flop will assume the reset state. If both the J- and K-input signals are 1, the next clock pulse will change the flip-flop to a state opposite from the state it was in prior to the clock pulse.

The SRT-type flip-flop (set, reset, trigger) operates in the following manner. For S, R, and T input signals of 0, the state of the flip-flop does not change. The application of an input signal of 1 at the S-input sets the flip-flop. Likewise, an input signal of 1 applied to the R-input terminal resets the flip-flop. The simultaneous application of an S-input signal of 1 and an R-input signal of 1 causes a race condition and the state of the flip-flop is not predictable. A T-input signal of 1 causes the flip-flop to change to the opposite state from that just prior to the application of the T-input signal.

When the J- and K-input signals of a clocked J-K flip-flop have the value of 1, the clock pulse performs the same function as the T-input signal of an SRT flip-flop.

A leading edge delay circuit produces an output signal only after a signal has been applied to its input terminal for a period of time equal to a given delay interval. The output signal is discontinued upon the removal of the input signal. An input signal which is shorter in duration than the given delay interval will not cause an output signal to be produced. Leading edge delay circuits are well known in the art and examples are shown in U.S. Pat. Nos. 2,836,715 by Spielberg; 3,073,971 by E. J. Daigle, Jr.; and 3,073,972 by R. H. Jenkins, all assigned to the same assignee as the present disclosure.

The input signals in the circuit shown in FIG. 1 are assumed to be coming from the read transducers of a tape station. Read transducers are coupled to read amplifiers and signal-forming circuits such as peak detectors. The result is that where a pulse is recorded on magnetic tape, an input signal to the circuit of the invention results. This input pulse has certain important characteristics: the input signals have short time durations relative to the intervals between signals; the input signals appear at the same time intervals as the signals are recorded on the tape. The latter characteristic is achieved by producing an input signal by a zero-crossing detector or a peak detector coupled to the read amplifier. A zero-crossing detector circuit is one in which an output signal is produced at the time the input signal passes through the 0 voltage level. A peak detector circuit, on the other hand, is designed to detect negative peaks or positive peaks and operates to produce an output signal at the time that an input signal has reached a maximum voltage in the negative or positive direction. The detector's output is coupled to a pulse-forming circuit, such as a monostable multivibrator, which produces output pulses of uniform duration.

In the preferred embodiment of the invention shown in FIG. 1, the up-to-speed time can be accurately measured by eliminating the overlap of two successive signals. The input signals are applied to the clock input terminal of a clocked J-K flip-flop 23, and to the S- and R-input terminals of an SR flip-flop 22 through a delay line 20 and a leading edge delay circuit 21, respectively. The Q and Q' output terminals of the SR flip-flop 22 are coupled to the J- and K-input terminals of the clocked J-K flip-flop 23, respectively.

The delay interval through the delay line 20 is equal to the duration of each input signal. The delay interval of the leading edge delay circuit 21 is equal to the interpulse interval to be detected.

Figure 2:
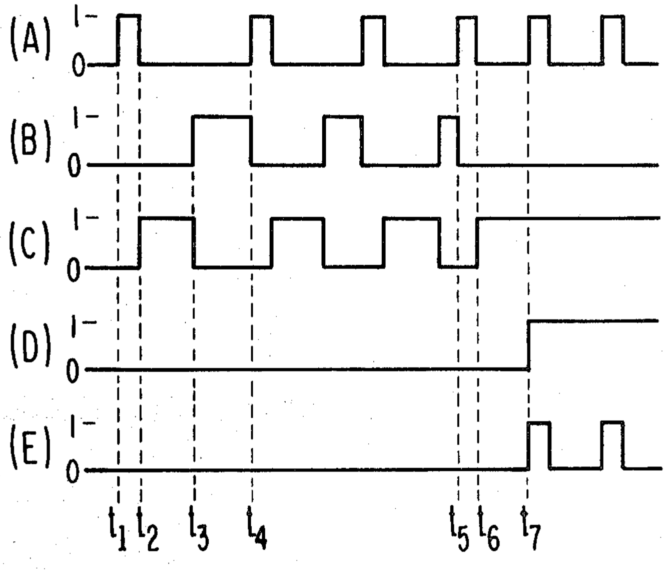
FIG. 2 is a graph of several idealized waveforms as they might appear at various points in the circuit shown in FIG. 1.

The operation of the circuit shown in FIG. 1 can be more easily understood by reference to the waveforms depicted in FIG. 2. At time $t_1$, an input signal occurs as shown in FIG. 2(A). At the trailing edge of the input signal at time $t_2$, the flip-flop 22 is set and the Q output signal assumes the value of 1 as shown in FIG. 2(C).

The negative-going edge of the input signal at time $t_2$ activates the leading edge delay circuit 21. After an interval of time equal to the delay interval of the leading edge delay circuit 21, the output signal of the leading edge delay circuit 21 assumes a value of 1 as shown in FIG. 2(B) at time $t_3$. This output signal resets the flip-flop 22 as shown in FIG. 2(C).

The occurrence of the next input pulse at time $t_4$ inactivates the output signal of the leading edge delay circuit 21. The trailing edge of this next input pulse sets the flip-flop 22 and activates the input terminal of the leading edge delay circuit 21. The output signal of the leading edge delay circuit 21 resets the flip-flop 22 and this process continues for successive input signals.

When an input signal occurs after the tape is up-to-speed, for example, at time $t_5$ in FIG. 2(A), the flip-flop 22 is set at the trailing edge of the input signal at time $t_6$. The next input signal occurs at time $t_7$ before the output signal from the leading edge delay circuit 21 has reset the flip-flop 22. This next input signal applied to the clock input terminal of the flip-flop 23 occurs while the Q output signal of the flip-flop 22 has the value of 1 and is priming the J-input terminal of the flip-flop 23 so that the input signal occurring at time $t_7$ changes the state of the flip-flop 23 from the reset to the set state, as shown in FIG. 2(D).

The Q output signal of the flip-flop 23 can be used to indicate that the tape is up-to-speed. If a pulse output signal is desired, the output signal of the flip-flop 23 can be coupled to a coincidence gate 24, the gate's other input signal being the input signals A. The pulses at the output terminal of the coincidence gate 24 would be as shown in FIG. 2(E) and can be used to signal a timer or other device that the tape is up to speed.

If the signal that was transmitted to the tape station to start the tape moving is used to start a timer and the output signal of the coincidence gate is used to stop the timer, the up-to-speed time can be read directly from the timer. The output of the timer can be digitally encoded and used by an electronic computer for maintenance analysis.

The purpose of the delay line 20 is to set the flip-flop 22 at the trailing edge of the input signals. Therefore, the delay interval of the delay line 20 must be equal to the time duration of the input signal. Alternatively, the delay line 20 could be replaced by an inverter followed by a monostable multivibrator. There are also other circuits which can be used to set the flip-flop 22 at the trailing edge of the input signal. For purposes of illustration, however, the delay line 20 is used.

The leading edge delay circuit 21 resets the flip-flop 22 a given period of time after the input signals' trailing edge. The delay interval of the leading edge delay circuit 21 is equal to the interval between input signals when the tape being read is up to speed. The input terminal of the leading edge delay circuit 21 is shown with a small circle. This is an inversion circle which indicates that the leading edge delay circuit 21 responds to negative going signals. It is, therefore, the complement of the input signals that comprise the input signals to the leading edge delay circuit 21, i.e., the leading edge of the complemented input signal is the trailing edge of the uncomplemented input signals. A leading edge delay circuit is used because its output signal is terminated by the termination of the input signal. The function performed by the leading edge delay circuit can also be performed by other circuits such as a delay line with an inverter that provides an input signal to a one shot, the output signal of which is the minimum duration required to reset the flip-flop 22.

The clocked J-K flip-flop 23 is used to provide from its Q output terminal a signal indicating that the tape is up to speed. It could be replaced with any of several other types of flip-flops such as the D-type in which case the Q' output terminal of the flip-flop 22 would not be used. Other types of flip-flops with proper input gating could be used to perform the same function.

A D-type flip-flop has a D-input terminal and a clock input terminal. When the D-input signal is 0, a clock signal causes the flip-flop to be reset; when the D-input signal is 1, a clock input signal causes the flip-flop to be set.

The output coincidence gate 24 is used to provide a pulsed output signal in response to the input signals.

The output signal indicating that the tape is up to speed is also useful for measuring the distance the tape travels from rest to its proper speed. While the tape is stopped, a character or bit (binary digit) is written on the tape in an unoccupied channel. A start signal is transmitted to the tape station and the up-to-speed output signal of the circuit described, using a previously written channel, causes another character or bit to be written on the tape. Writing bits in different channels is preferable. The tape can then be read at a constant speed and the time interval between the bits will, when multiplied by the tape velocity, give the start distance of the tape station on which the test is performed. Writing the bits in different channels simplifies the starting and stopping of the timer.

What is claimed is:

1. In a circuit for providing an indicative output signal when a group of serial input signals, which are separated by decreasing intervals of time, are separated by a given interval of time, the combination comprising:

a first flip-flop;

means responsive to the trailing edge of the input signals for setting the first flip-flop;

delay means responsive to the input pulses for producing an output signal a given interval of time after each input pulse for resetting the first flip-flop; and a second flip-flop connected to be set by an input signal when the first flip-flop is set and to be reset by an input signal if the first flip-flop is reset, for producing the indicative output signal when set.

2. The invention as set forth in claim 1 wherein said second-stated means comprises a delay means having a delay interval equal to the time duration of said input signals.

3. The invention as set forth in claim 2 wherein said delay means is comprised of the leading edge delay circuit.

4. The invention as set forth in claim 3 wherein said first flip-flop is an S-R flip-flop and said second flip-flop is a clocked J-K flip-flop.

5. The invention as set forth in claim 4 wherein said second flip-flop is a D-type flip-flop.

6. The invention as set forth in claim 5 including a coincidence gate responsive to the input signals and the output of the second flip-flop for producing output signals when input signals occur and the second flip-flop is in the set state.

* * * * *